United States Patent [19]

Amikura et al.

[11] 4,146,312
[45] Mar. 27, 1979

[54] SOUND MOTION PICTURE CAMERA AND SOUND MOTION PICTURE SYSTEM

[75] Inventors: Takashi Amikura, Tokyo; Yutaka Kohtani, Yokohama; Kiyoshi Takahashi, Kunitachi, Japan

[73] Assignee: Canon Kabushiki Kaisha, Tokyo, Japan

[21] Appl. No.: 859,642

[22] Filed: Dec. 12, 1977

[30] Foreign Application Priority Data

Dec. 16, 1976 [JP] Japan ................................ 51-151282

[51] Int. Cl.² ........................................... G03B 31/02
[52] U.S. Cl. ........................................... 352/27; 352/5
[58] Field of Search ..................... 352/5, 6, 7, 8, 9, 10, 352/27, 29, 30

[56] References Cited

U.S. PATENT DOCUMENTS 3,452,161  6/1969  Hafler ................................ 352/37 X
4,059,349  11/1977  Homine et al. ..................... 352/27 X

FOREIGN PATENT DOCUMENTS 2417095 11/1974 Fed. Rep. of Germany.

Primary Examiner—Michael L. Gellner
Attorney, Agent, or Firm—Toren, McGeady and Stanger

[57] ABSTRACT

A sound motion picture camera, capable of using a film strip having a main stripe of magnetic recording material along one side edge of one surface and a balance stripe of magnetic recording material along the other edge of the same surface as well as its motion picture. The camera has a recording magnetic head arranged in correspondence with the main stripe and a second recording magnetic head arranged in correspondence with the balance stripe. Thus the same sound signal can be recorded on both the main and the balance stripe through first and second recording magnetic heads. Separate from the camera a sound recording/reproducing device for cooperation with the aforementioned film is provided with a sound recording/reproducing head and an erase magnetic head in a position corresponding to the main stripe and a sound reproducing head in a position corresponding to the balance stripe. A sound signal recorded on the balance stripe is reproduced by the sound reproducing head and heard through a speaker. Another sound signal from a microphone is recorded on the main stripe of the film at a desired position, through the sound recording/reproducing head.

13 Claims, 7 Drawing Figures

SOUND MOTION PICTURE CAMERA AND SOUND MOTION PICTURE SYSTEM

BACKGROUND OF THE INVENTION

1. Field of the Invention

The present invention relates to a sound motion picture camera and its sound motion picture system.

2. Description of the Prior Art

Many motion picture films are available with sound information recorded with the picture information. Two methods exist for this sound information on the film methods, optical and magnetic. While the former method makes it impossible simply to erase already recorded sound and to record new sound on the film, the latter method allows for erasing of the already recorded sound and recording of new sound "on the erased portion or overlapping" the already recorded sound.

In the field of 8 m/m size films, however, until a few years ago, there was no film capable of magnetic recording of sound information in the market, and therefore the optical recording method prevailed. Consequently, all the sound motion picture projectors of the type using 8 m/m size films which were available a few years ago employed the method by which the sound information optically recorded on the film is reproduced optically. Recently, however, 8 m/m size films capable of magnetically recording sound information came on the market, sold under the trade name "Sound Movie Film" from Eastman Kodak Company in U.S.A. In response to this, a rapidly increasing number of sound motion picture cameras capable of magnetically recording sound information on the film in combination with sound motion picture projectors capable of magnetically reproducing the sound information of the film are being developed.

The above mentioned "Sound Movie Film" as disclosed in U.S. Pat. No. 3,858,968 has a main stripe of magnetic recording material along one edge of one surface of the film and a balance stripe of magnetic recording material along the other edge of the same surface of the film, the balance stripe being located adjacent a series of perforations in the film and the light sensitive emulsion on the film typically being located on the opposite (lower) surface of the film. This film is made with a balance stripe in combination with the main stripe because when only the main stripe is applied to the base material of the film, the film tends to produce an inclined coil as it is wound up. The balance stripe compensates for the difference in thickness between the two sides of the film.

With this type film, therefore, sound information is usually recorded only on the main stripe, while the balance stripe is not used for recording sound. This fact is by no means due to the impossibility of recording sound information on the balance stripe, but to the quality of extreme inferiority of the sound reproduced from the balance stripe in quality to that of the main stripe because the width of the balance stripe is considerably narrower than that of the main stripe. If we are not concerned about this loss of sound quality, it is of course possible to make use of the balance stripe for recording sound information, as, for example, disclosed in DOLS 2,417,095. In this motion picture system, the film is prepared with background music recorded on the main stripe. Then this film is used by a camera to record picture information together with corresponding sound information, the latter being recorded on the balance stripe. The sound information recorded on the balance stripe by the camera is transferred to the main stripe of the same film by an editor having recording/reproducing heads respectively corresponding to the main and balance stripe. Thus the sound information of the balance stripe, such as dialog or narration is overlapped on that of the main stripe such as background music. Alternatively, after the aforementioned sound information of the main stripe has been erased at portions, the sound information recorded on the balance stripe by the camera is transferred to the main stripe at the erased portions.

In the field of tape recording, it is very common practice to edit the original sound on a tape having a strip of magnetic recording material. There are two editing methods: "sound on sound" and "sound with sound". The sound-on-sound editing method comprises recording a sound signal on a first track of a magnetic tape, reproducing it by a recording/reproducing head provided for said the track, mixing the reproduced sound, while being heard, with a new sound signal, and supplying the mixed sound signals with overlapping of a bias to a second recording/reproducing head provided for a second track of the tape. The original sound signal and the new sound signal are, thus recorded on said second track on the tape in unison. When reproduced by operating the second recording/reproducing head, both of the sound signals can be heard mixed with each other.

On the other hand, the sound-with-sound editing method involves recording a sound signal on a first track of a magnetic tape and reproducing the sound signal by a first recording/reproducing head. A new sound signal is supplied with overlapping of a bias to a second recording/reproducing head provided for a second track of the same tape in line with said first recording/reproducing head, while the sound reproduced from the first track is heard. Thus the new sound signal is recorded on the second track separate from, but in synchronism with the sound signal previously recorded in the first track. When reproduced by simultaneously operating the first and second heads, the two sound signals from the first and second tracks can be heard mixed with each other. However, the "sound-on-sound" and "sound-with-sound" methods require at least two tracks on a common magnetic tape so that the tape recorder adapted to operate with only one track cannot perform such editing.

Therefore, the aforementioned magnetic recording type photographic film for recording picture with sound accompaniment is, because of the narrow width of said main stripe, impossible to use for the "sound-on-sound" and "sound-with-sound" methods. For this reason, the conventional sound motion projector is constructed with an erasing head and a recording/reproducing head arranged in the order in which the film is fed film is transported, so that when "double record" is performed, the erasing head is inoperative, and the recording/reproducing head is supplied with sound signal information overlapped on a bias. When "entire erase-record" is performed, both of the erasing and recording/reproducing heads are operative. In the latter connection, it should be explained that the film passes first over the erasing head to erase the, original sound signal recorded in the main stripe and then over the recording/reproducing head to record a new sound signal in the main stripe.

A conventional sound motion projector capable of "double record" and "entire erase-record" is however characterized by a lack of means by which the operator may listen to the sound reproduced from the original sound information when recording the new sound information. Accordingly, the position of that portion of the magnetic recording track which is subject to the double recording or the entire erase-recording operation has to be determined by the use of the operator's head or "sixth sense", while viewing the projected picture. If the operator is wrong, the necessary sound information may be erased by mistake when using the erase-record method and conversely unnecessary sound is left unerased through oversight. When double record is performed, the two sound signals tend to be undesirably displaced from one an other. Thus, with sound motion picture projector, it is very difficult to do sound editing and it can not be effected as accurately as desired.

One means to overcome the above mentioned drawbacks of the conventional sound motion projector, is proposed in connection with the sound editing for the conventional sound motion projector which uses a magnetic recording medium with only one track on a single main stripe such as sound film. According to this proposal, for erase-record the operator makes use of a means by which a reproducing head are arranged, erasing head and recording head in this order in the direction in which the film is fed. When the "entire erase-record" is performed, the original sound signal is first reproduced by the reproducing head. Then that sound signal is erased by the erasing head positioned behind the reproducing head, and the reproduced signal is heard. At the same time a new signal is fed together with a bias to the recording head positioned to the rear of the erasing head, so that the reproduced signal and the new signal are recorded in unison on the film. When double record is performed, the erasing head is operative, and the prerecorded signal is reproduced by the reproducing head. While listening to the reproduced sound, the operator controls supply of a new signal together with a bias to the recording head so that the reproduced signal and the new signal are recorded in unison on the film. However, this type projector is associated with an drawback; as the reproducing and recording heads are separated along the length of the film by an appreciably large distance, the sound-on-sound editing operation results in a displacement of the later recorded signal from the corresponding picture.

The presently available sound motion picture system is designed so that sound editing is performed mainly in the projector. Accordingly, almost no attempts have been made to eliminate the afore mentioned drawbacks by taking into account otherwise effective improvements of the sound motion picture camera.

SUMMARY OF THE INVENTION

A first object of the present invention is to provide a motion picture camera suitable to a sound motion picture system using the conventional film strip having the main stripe of magnetic recording material along one side edge of one surface of the film and the balance stripe of magnetic recording material along a other side edge of the same surface.

A second object of the present invention is to provide a sound motion picture system capable of performing sound editing reliably and accurately.

A third object of the present invention is to provide a motion picture camera adapted for use with the afore mentioned film strip, and constructed to include a first and a second recording magnetic head arranged in correspondence to the main and balance stripes, respectively. Thus the same sound signal can be recorded on both the main stripe and the balance stripes through first and said second recording magnetic heads simultaneously.

Other objects of the present invention will become apparent from the following detailed description taken in conjunction with the accompanying drawings.

DESCRIPTION OF THE PREFERRED EMBODIMENTS

One embodiment of a sound motion picture camera and its sound motion picture system according to the present invention is described in detail below.

Figure 1:
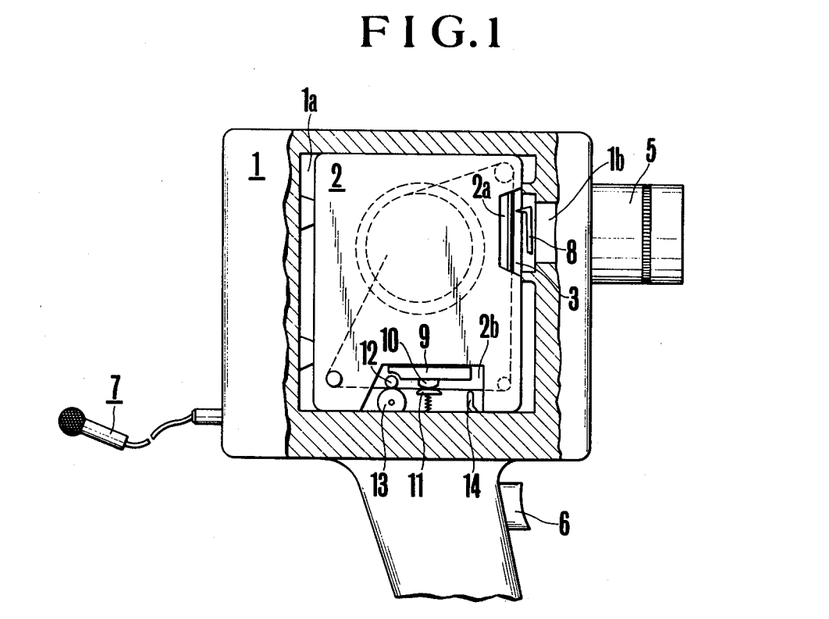
FIG. 1 is an elevational view of a sound motion picture camera according to the present invention with the side panel partly broken away to illustrate an arrangement of the basic parts.
Figure 2:
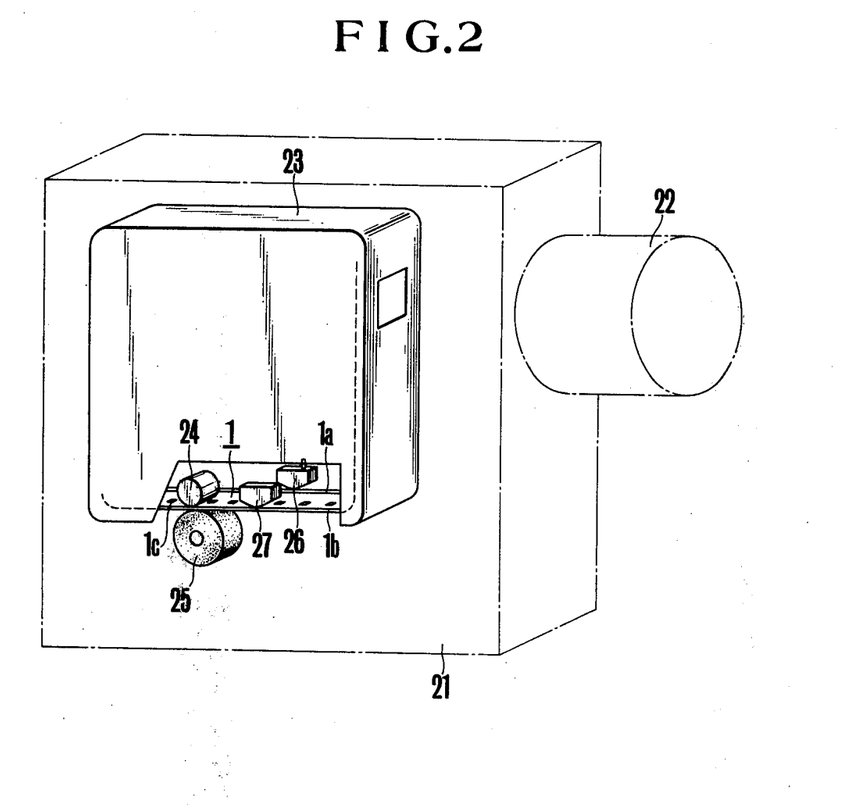
FIG. 2 is a perspective view representing the relationship of a capstan and pinch roller of the camera of FIG. 1 to a film.
Figure 3:
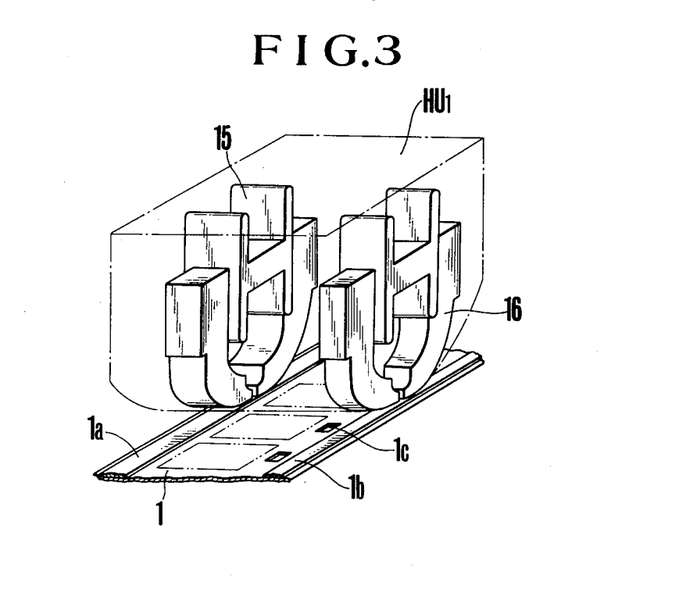
FIG. 3 is a perspective view representing the structure of a magnetic recording head unit applicable to a sound motion picture camera according to the present invention.
Figure 4:
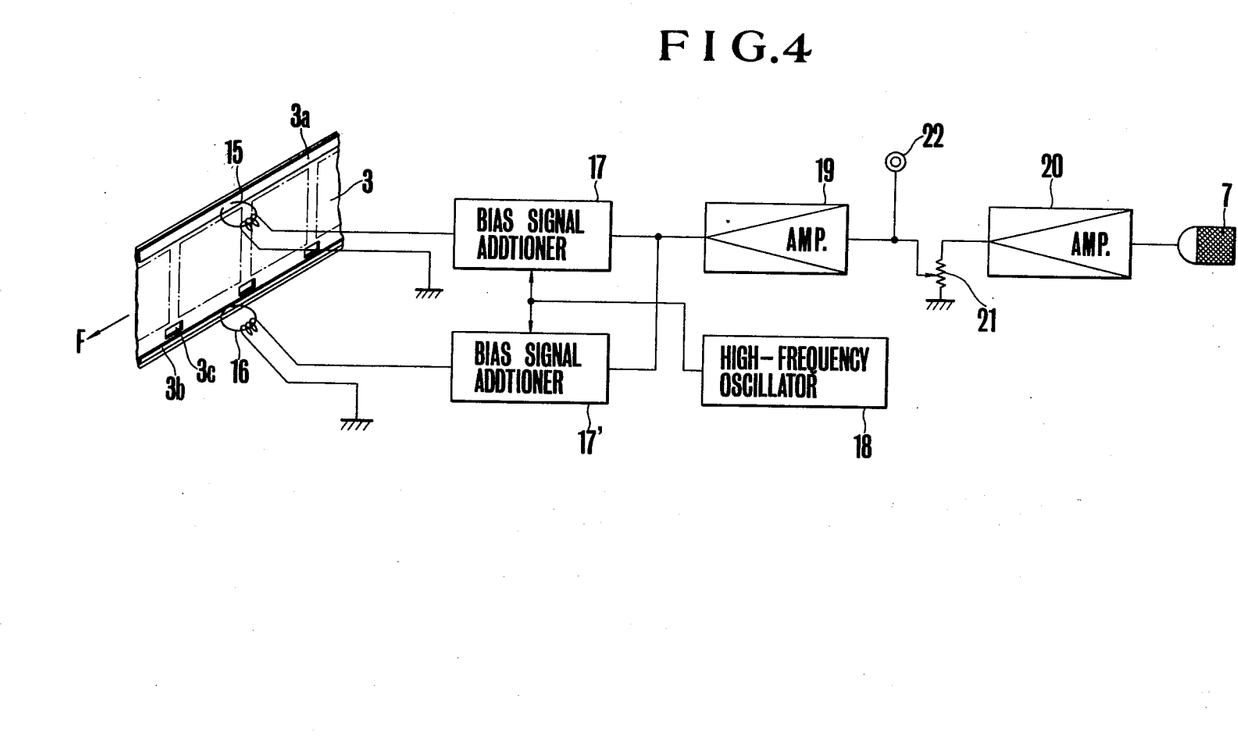
FIG. 4 is a schematic electrical circuit diagram of one embodiment of an audio circuit for use in a sound motion picture camera of the present invention.

In FIGS. 1 and 2, a sound motion picture camera has a housing 1 with a casette receiving chamber 1a to receive a sound film casette 2 such as that disclosed in U.S. Pat. No. 3,858,968. An image gate 1b is formed in the front panel of housing 1 in alignment with an objective lens 5. The cassette 2 has a first cutout 2a for exposure of a film strip 3, which is contained in the cassette 2, and a second cutout 2b for sound recording. The first and second cutouts 2a and 2b are respectively aligned with the image gate 1b and with a sound recording station at the bottom of the chamber 1a when the cassette 2 is inserted into and seated in it. The film strip 3 is pulled from a supply spool in the cassette 2 by pull or pulling claw 8 to intermittently advance it past the film gate 1b to the sound recording station 2b. The film 3 then passes over a head pad 11 biased by a spring to operatively engage it with the magnetic head 10, which is fixedly mounted on a position regulating unit 9. From there, the film 3 is fed back to a takeup spool coaxial to said supply spool by the pinching of a roller 13 on the film 3 against a driving capstan 12. As shown in FIGS. 3 and 4, the film 3 is provided with a main stripe 3a of magnetic recording material along one edge and a balance stripe 3b of magnetic recording material along the other edge of the same surface. The film 3, the balance stripe 3b is located adjacent a series of perforations in 3c in the film 3, with the light sensitive emulsion on the film typically located on the opposite (lower) surface of the film 3. On this account, as shown in FIG. 3, the aforementioned head unit 10 which is indicated at HU1 consists of a first sound magnetic recording head 15 arranged in a position corresponding to a main stripe 1a and a second sound magnetic recording head 16 arranged in a position corresponding to the balance stripe 1b.

The pulling claw 8 is intermittently driven by a driving means of known construction not shown, and advances the film 3 by one frame between picture taking stops by intermittently engaging with the perforations 3c. The driving of the claw 8 is controlled by a means including a loop sensor 14 for detecting a slack loop of the film 3 between the film gate 1b and the head unit 10. The capstan 12 is continuously driven by a driving means of known construction not shown, including a motor to transport the film past the sound recording station at a constant speed, as the film 3 is pressed it by the pinch roller 13. The pinch roller 13 and the head pad 11 are operatively coupled to a release button 6 through a common displacement means of known construction so that it is not depressed, the head pad 11 and pinch roller 13 remain spaced apart from the head unit 10 and the capstan 12 respectively, and the loop sensor 14 is also retracted from the film channel by a sufficiently large distance. Conversely when the release button 6 is depressed, the head pad 11 and the pinch roller 13 are brought into resilient contact with the head unit 10 and the capstan 12 respectively, and the loop sensor 14 is rendered effective for detection of film loop amount.

An audio circuit is shown in FIG. 4 for use in the sound motion picture camera of the present invention shown in FIGS. 1 to 3. This circuit includes an amplifier 20 which amplifies a sound signal from a microphone 7, a variable resistor 21 accessible from the outside of the camera housing to adjust the sound recording level, a terminal 22 which connects to a monitor (not shown), and an amplifier 19 for further amplifying the sound signal entering through the amplifier 20 and the variable resistor 21. Also included are a high-frequency oscillator 18, and two bias signal adders 17 and 17' each receptive of a bias signal from the oscillator 18 and of the sound signal entering through the amplifier 19 for producing a bias-overlapped sound signal to each of the sound magnetic recording heads 15 and 16.

In operating the audio device of such construction, audible sound is converted by the microphone 7 to an electrical signal and this sound signal is applied through the amplifier 20, variable resistor 21 and amplifier 19 to each of the bias signal adders 17 and 17'. At the same time, a bias signal is also applied to the bias signal adders 17 and 17' from the high-frequency oscillator. As a result, the sound signal from the amplifier 19 is overlapped on the bias signal from the high-frequency oscillator 18 by these bias signal adders 17 and 17'. The overlapped signal is fed to each of the sound recording heads 15 and 16 so that the same signal is recorded on both the main stripe 3a and the balance stripe 3b of the film 3. The sound motion picture camera of the invention provides a prerecorded sound film with the main stripe 3a and the balance stripe 3b utilized in such a manner. This film 3, when edited as described below, produces many effects.

Figure 5:
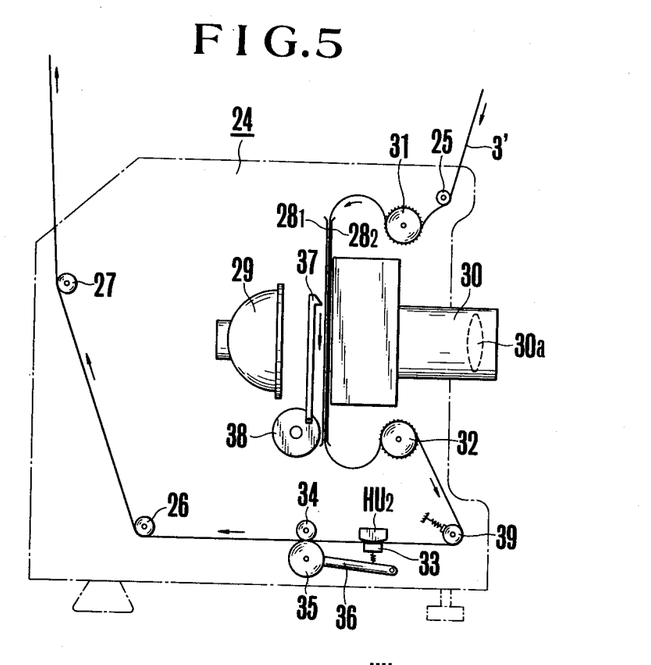
FIG. 5 is a schematic view of one embodiment of a sound motion picture projector suitable for use in a sound motion picture system according to the present invention.
Figure 6:
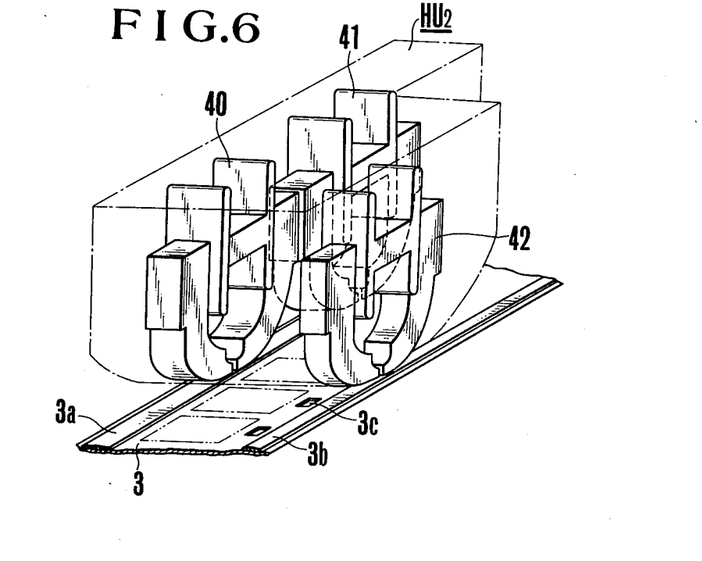
FIG. 6 is a perspective view representing the structure of a magnetic recording head unit adapted for use in the sound motion picture projector shown in FIG. 5.
Figure 7:
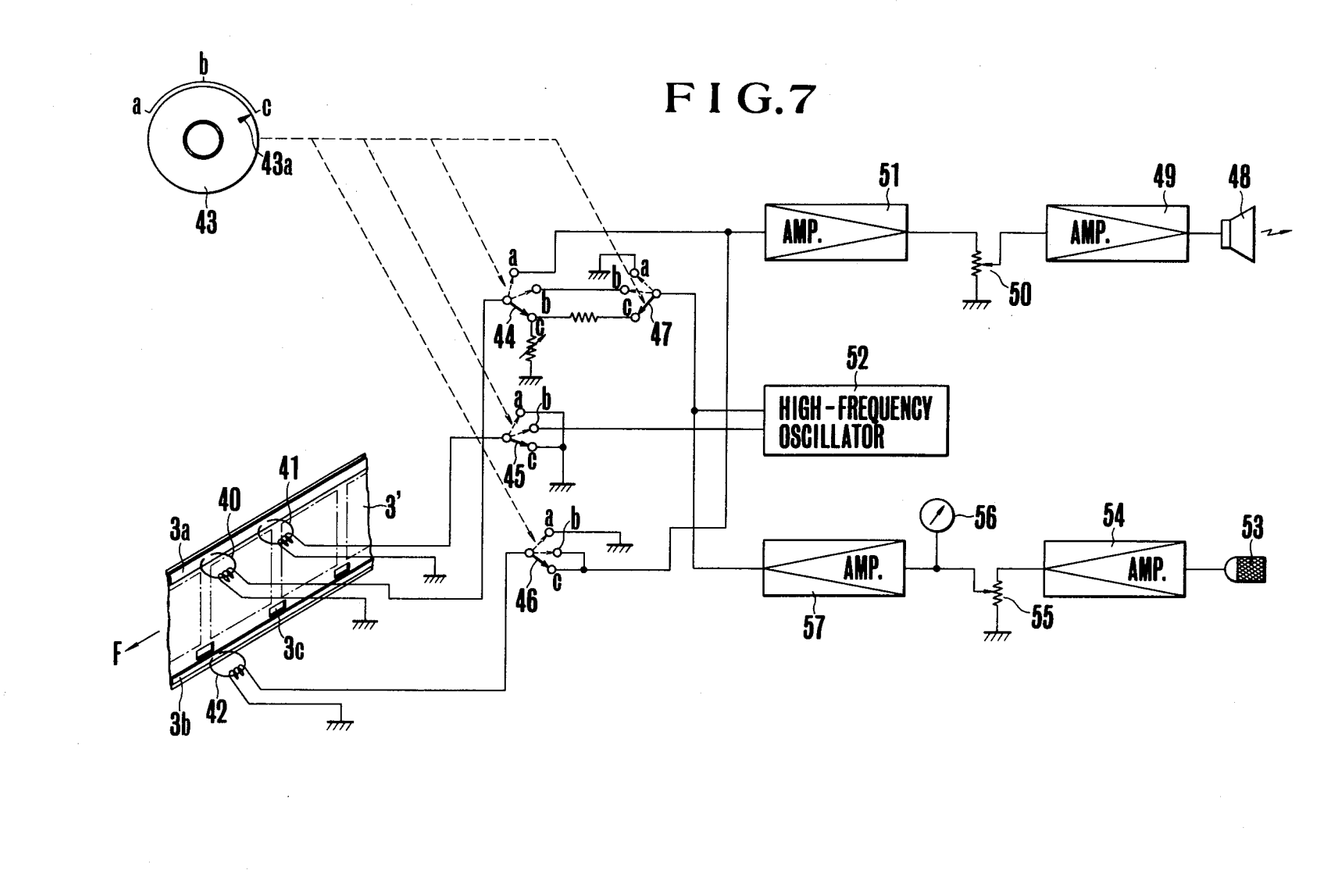
FIG. 7 is a schematic electrical circuit diagram of one embodiment of an audio circuit adapted for use in the sound motion picture projector shown in FIG. 5.

An embodiment of a sound motion picture projector having a function equivalent to that of the aforesaid editor, is shown in FIGS. 5 to 7. A projector has a housing 24 represented by dot-and-dash lines, and three film guide rollers 25, 26 and 27 are rotatably mounted on it. A pair of film gate plates $28_1$ and $28_2$ have framing apertures aligned with each other and with a projection light beam from a lamp 29 to a projection lens 30a in a lens mount 30. A film strip 3' from a supply spool not shown is trained around the first guide roller 25 and is then led to an upper sprocket 31 whose teeth extend into the perforations of the film 3' and which is driven by a not shown driving means known in the art together with a lower sprocket 32, a capstan 34 and a pulldown claw 37. After moving past the sprocket 31, the film 3' is intermittently advanced by the pulling claw 37 to pass between the film gate plates ($28_1$ and $28_2$) and then around the lower sprocket 32 and a loop former 39 respectively. The film 3' is then led along a sound head unit HU2 whose details are shown in FIG. 6 and which is located opposite a pad 33, while being driven at a constant speed as it is pressed against the capstan 34 by a pinch roller 35. The pinch roller 35 and the pad 33 are mounted on a common carrier 36 which moves between a first position where the pinch roller 35 and the pad 33 are in resilient contact with the capstan 34 and the head unit HU2 respectively (as shown in FIG. 5), and a second position where the former and latter parts are apart. This is effected by an operating member (not shown) accessible from the outside of the projector housing 24. The pulling claw 37, capstan 34 and lower sprocket 32 are driven by the common driving means of the upper sprocket 31, but the speed of claw 37 and capstan 34 is regulated by the loop former through a speed regulating means (not shown), as the amount of loop between pulling claw 37 and the capstan 34 detected by the loop former 39 varies.

As the film 3' which is intended to be used in the projector of such construction was exposed with synchronous recording of the sound accompaniment by the camera of the invention shown in FIG. 1 to FIG. 4, and subsequently processed, motion pictures are already recorded on it. Further, the same sound accompaniments for said motion pictures are already recorded on both the main stripe 3a and the balance stripe 3b. Referring to FIG. 6, the sound head unit HU2 consists of a recording/reproducing magnetic head 40 and, an erase magnetic head 41 positioned in alignment along the length of the film 3' and located opposite the main stripe 3a. Also included in sound head unit HU2 is a sound reproducing head 42 positioned in lateral alignment with the sound recording/reproducing head 40 and located opposite the balance stripe 3b. As shown in FIG. 6, these three heads 40, 41 and 42 are to be used as one head unit HU2. Though the head 40 is shown as selectively functioning to record and to reproduce the sound signal, it may be constructed from two separate head elements one of which is adapted for sound recording and the other for sound reproducing. In the normal motion picture operation, the film 3' is fed in a direction indicated by an arrow F in FIG. 7. Further, FIG. 7 shows a block diagram of an audio circuit used in the projector of FIGS. 5 and 6. This circuit includes an assembly of four switch elements 44, 45, 46 and 47 operated by a common switching dial 43 accessible from the outside of the projector housing 24. When finger or mark 43a on the dial 43 is registered with any one of three indices a, b or c, each of a switch elements 44 to 47 is set to the corresponding, a, b or c for "sound reproduction", "entire erase-record" or "double record" respectively. A speaker (or headphone) is represented by 48, and an amplifier by 49. Variable resisters 50 and 55 are manually adjustable from the outside of the projector housing 24. A high-frequency oscillator is represented by 53. Amplifiers are represented by 51, 54, and 57, and a level meter is represented by 56.

When the switching dial 43 is turned to place its mark 43a in registry with index "a", the erasing head 41 and reproducing head 42 are rendered inoperative, while only the sound recording/reproducing magnetic head 40 is operative in the sound reproducing state. The sound signal on the main stripe 3a is picked up by the head 40 and directed through the switch 44, amplifier 51, variable resistor 50 and amplifier 49 to the speaker 48 by which it is converted to an audible signal. When the switching dial 43 is turned to place the mark 43a in registry with the index "b", the erasing head 41 is connected to the high-frequency oscillator 52, and the head 40 changes to the sound recording state. As the film 3' is transported in the direction of arrow F, the sound signal on the balance stripe 3b which is identical to that recorded in the main stripe 3a is reproduced by the reproducing head 42, is applied through the switch 46, amplifier 51, variable resistor 50 and amplifier 49 to the speaker 48 by which it is converted to an audible signal. At the same time, a new audible sound is converted by the microphone 53 to an electrical sound signal which is then applied through the amplifier 54, variable resistor 55, amplifier 57, and switches 47 and 44 to the head 40 together with the bias signal from the high-frequency oscillator 52. The output of the head 40 is recorded in the main stripe 3a at a position where the prerecorded sound signal has been erased by the erasing head 41. In this case, therefore, it is possible to control the positioning of the new sound signal on the main stripe 3a while the operator is listening to the reproduced sound from the balance stripe 3b (which is accurately synchronized with that prerecorded in the main stripe 3a. Thus the position where the new sound signal must be recorded can be assessed with high reliability and accuracy. Next, when the switching 43 is turned to place the mark 43a in registry with the index "c", the erasing head 41 is rendered inoperative again, but the head 40 remains in the sound recording state. The sound signal on the balance stripe 3b identical to that recorded on the main stripe 3a is again reproduced by the head 42 and applied through the switch 46, amplifier 51, variable resistor 50 where it amplifier 49 to the speaker 48 and is converted to an audible signal. At the same time, an audible sound is converted to an electrical signal by the microphone 53 and this new sound information signal is applied through the amplifier 54, variable resistor 55, amplifier 57 and switches 47 and 44 to the head 40 together with the bias signal from the high-frequency oscillator 52. The output of the head 40 is recorded in the main stripe 3a. In this case, the prerecorded signal in the main stripe 3a is not entirely erased, so that the new sound signal from the microphone is overlapped on the original sound signal. And, in this case also, it is possible to control the positioning of the new sound signal while the operator is listening to the original sound signal from the balance stripe 3b, so that the position of the new sound signal relative to the prerecorded signal can be assessed with high reliability and accuracy.

Though the aforementioned sound recording/reproducing magnetic head 40 is shown as selectively functioning to record and reproduce sound, it may be constructed from two separate elements one of which is adapted to record sound and the other to reproduce sound.

What is claimed is:

1. A sound motion picture camera for exposing a sound film strip contained in a cassette which has a first opening for exposing the film and a second opening for sound recording on the film, the film having a main stripe of magnetic recording material along one edge and a balance stripe of magnetic recording material along the other edge, comprising:
    (a) a housing having a cassette-receiving chamber;
    (b) film feed means in the housing engageable with the film of the inserted cassette at said chamber for transporting the film past the first opening and the second opening;
    (c) picture means in the housing for taking motion picture in the form of motion picture frames on the film passing the first opening of the cassette; and
    (d) sound recording means in the housing for recording sound on the film passing through the second opening of the cassette, said sound recording means having:
        first magentic head means mounted in the chamber for recording sound on said main stripe of the film, said means being arranged opposite the main stripe of the film passing through said second opening;
        second magnetic head means mounted in the chamber for recording sound on said balance stripe of the film, said means being arranged in a position opposite to the balance stripe of the film passing through said second opening; and
        sound recording circuit means for supplying the same sound signal to both of said first magnetic head means and said second magnetic head means simultaneously.

2. A sound motion picture camera according to claim 1, in which said sound recording circuit means includes amplifier means for amplifying a sound signal applied from a microphone, and means for supplying the output signal of said amplifier means as well as a bias signal to each of said first and second magnetic head means.

3. A sound motion picture camera according to claim 1, in which said film feed means includes first feed means for intermittently transporting said film passing said first opening of the cassette and second feed means for transporting the film past said sound-recording means at a substantially constant speed.

4. A sound motion picture camera according to claim 1, in which said first head means and said second head means are constructed as one head unit.

5. A sound motion picture camera for exposing a sound film contained in a cassette which has a first opening for exposing the film and a second opening for sound recording of the film, the film having a main stripe of magnetic recording material along one edge of the film and a balance stripe of magnetic recording material along the other edge of the film, comprising:
    (a) a housing having a cassette-receiving chamber;
    (b) first feed means in the housing engageable with the film of the inserted cassette at the chamber for intermittently transporting the film at the first opening of the cassette;
    (c) picture taking means in the housing for taking motion pictures in the form of motion picture frames on the film passing through said first opening of the cassette;

(d) second feed means in the housing engageable with the film of the inserted cassette at said chamber for transporting the film at a substantially constant speed in said second opening of the cassette;
(e) drive means for actuating said first and second feed means; and
(f) sound recording means in the housing for recording sound on the film passing through said second opening of the cassette, said sound recording means having:
first magnetic head means in the chamber for recording sound on said main stripe of the film; said means being arranged opposite to the main stripe of the film passing through said second opening of the cassette on an upstream side of said second feed means;
second magnetic head means in the chamber for recording sound on said balance stripe of the film, said means being arranged in a position opposite to the balance stripe of the film passing through said second opening of the cassette on an upstream side of said second feed means; and
sound recording circuit means for supplying the same sound signal to both of said first magnetic head means and said second magnetic head means simultaneously.

6. A sound motion picture camera according to claim 5, in which said first head means and said second head means are constructed as one head unit.

7. A sound motion picture camera according to claim 5, in which said sound recording circuit means includes amplifier means for amplifying a sound signal applied from a microphone, and means for supplying the output of said amplifier means and a bias signal to each of said first and second magnetic head means.

8. A sound motion picture camera according to claim 5, in which said driving means is provided with speed regulating means for controlling at least one speed of said first feed means and said second feed means to make the film between said first feed means and said second feed means substantially constant in length.

9. A sound motion picture system using a film strip having a main stripe of magnetic recording material along one edge of the film and a balance stripe of magnetic recording material along the other edge of the film, said system comprising in combination:
(1) a sound motion picture camera for exposing and sound-recording said film, including:
(a) a housing having a film receiving chamber with an image recording location and a sound recording location;
(b) film feed means in the housing for transporting the film so as to pass through said image recording location and then through said sound recording location; said film feed means being engageable with the film loaded in said chamber;
(c) picture taking means in the housing for taking motion pictures in the form of motion picture frames on the film passing through said image recording location; and
(d) sound recording means in the housing for recording sound on the film passing through said sound recording location, having:
first magnetic head means mounted in the chamber for recording sound on said main stripe of the film, said means being arranged in a position opposite the main stripe of the film passing through said sound recording location;
second magnetic head means mounted in the chamber for recording sound on said balance stripe of the film, said means being arranged in a position opposite the balance stripe of the film passing through said sound recording location; and
sound recording circuit means for supplying the same sound signal to both said first magnetic head means and said second magnetic head means simultaneously, and
(2) a sound motion picture projector using the film on which images and sound are recorded by said camera and capable both of reproducing the images and the sound and of additionally recording new sound on said main stripe of the film, said projector including:
(a) a housing forming a sound recording reproducing location and an image reproducing location;
(b) film feed means in said housing for transporting the film successively through said image reproducing location and said sound recording/reproducing location;
(c) sound recording/reproducing means in said housing; having:
sound recording/reproducing magnetic head means for recording a new sound signal on said main stripe and for reproducing the sound signal which was recorded on that stripe, said means being arranged in a position opposite said main stripe of the film passing through said sound recording/reproducing location;
magnetic erasing head means for magnetically erasing the sound signal recorded on said main stripe, said magnetic head means being arranged on an upstream side of said first head means in alignment with said first head means along the path of transport of said main stripe of the film;
sound reproducing head means for reproducing the sound signal recorded on said balance stripe, said means being arranged opposite said balance stripe of the film passing through the sound recording/reproducing location;
sound recording/reproducing circuit means for selectively supplying a signal which causes said sound recording/reproducing head means and said sound reproducing head means to operate and a signal which causes said erasing head to operate;
first signal converting means for converting said sound signal reproduced by said sound recording/reproducing head means and said sound reproducing head means to an audible signal through said sound recording/reproducing circuit means; and
second signal converting means for converting audible sound to an electrical signal which is applied through said sound recording/reproducing circuit means to said sound recording/reproducing head means; and
(d) selector switch means for switching said sound recording/reproducing means to various modes, said selector switch means having:
a plurality of switches for selectively connecting the electrical circuits in said sound recording/reproducing circuit means; and
manual operating means operatively coupled to said plurality of switches and accessible from the outside of said housing to operate said plurality of switches, said means being switchable to selectively render operative at least the following modes;

(1) a first mode in which, while said erasing head means and said sound reproducing head means remain ineffective, said sound recording/reproducing head means is enabled to reproduce sound, and the sound signal reproduced by said head means is made audible by said first signal converting means;

(2) a second mode in which said erasing head means is rendered effective, said sound recording/reproducing head means is enabled to record sound, the sound signal from said second signal converting means is applied to said sound recording/reproducing head means, and the sound signal reproduced by said sound reproducing head means is applied to said first signal converting means; and (3) a third mode in which, while said erasing head means remains ineffective, said sound recording/reproducing head means is enabled to record sound, the sound signal from said second signal converting means is applied to said sound recording/reproducing head means, and the sound signal reproduced by said sound reproducing head means is applied to said first signal converting means.

10. A sound motion picture system according to claim 9, in which said sound recording/reproducing magnetic head means has a sound recording magnetic head and a sound reproducing magnetic head.

11. A sound motion picture system according to claim 9, in which said sound recording/reproducing magnetic head means and said erasing head means and said sound reproducing head are constructed as a single head unit.

12. A sound motion picture system according to claim 9, in which said first signal converging means includes a speaker.

13. A sound motion picture system according to claim 9, in which said second signal converting means includes a microphone.

* * * * *